March 17, 1959 G. J. POOLE 2,877,583
LICENSE PLATE HOLDER
Filed Aug. 30, 1957

George J. Poole
INVENTOR.

United States Patent Office 2,877,583
Patented Mar. 17, 1959

2,877,583

LICENSE PLATE HOLDER

George J. Poole, Los Angeles, Calif.

Application August 30, 1957, Serial No. 681,365

2 Claims. (Cl. 40—125)

The present invention relates to new and useful improvements in license plate holders, particularly for motor vehicles, trailers, etc., and has for its primary object to provide, in a manner as hereinafter set forth, a device of this character which will permit such plates to be readily mounted and removed without the use of tools.

Another important object of the invention is to provide a holder of the aforementioned character which will securely hold license plates of various sizes.

Other objects of the invention are to provide a vehicle license plate holder of the character described which will be comparatively simple in construction, strong, durable, compact, of light weight, and which may be manufactured at low cost.

Figure 1:
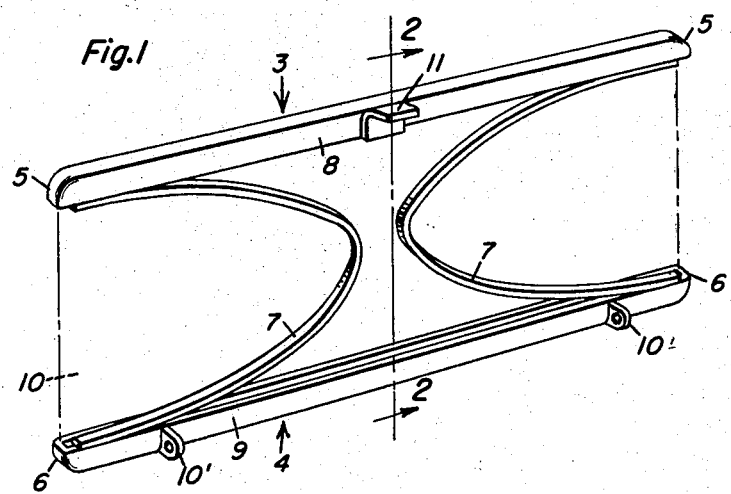
Figure 2:
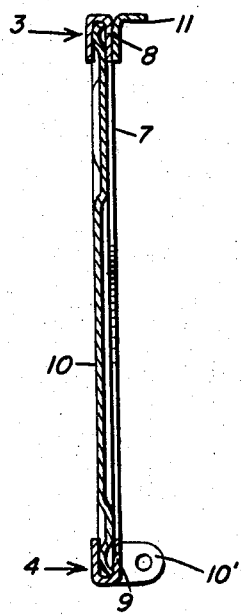

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of a vehicle license plate holder constructed in accordance with the present invention; and Figure 2 is a view in transverse section, taken substantially on the line 2—2 of Figure 1.

Referring now to the drawing in detail, it will be seen that the embodiment of the invention which has been illustrated comprises a pair of opposed, vertically spaced upper and lower channel bars 3 and 4, respectively, of suitable metal. The bars 3 and 4, which may also be of any desired dimensions, comprise rounded, closed ends 5 and 6, respectively.

The upper and lower channel bars 3 and 4 are yieldingly connected by a pair of outwardly opening, substantially U-shaped springs 7 of suitable resilient metal. The end portions of the springs 7 are fixed as by welding to the rear flanges 8 and 9, respectively, of the upper and lower channel bars 3 and 4. The bars 3 and 4 are for the reception of the upper and lower longitudinal marginal portions of a conventional vehicle license plate 10.

Also affixed to the rear flange 9 of the lower bar 4, at longitudinally spaced points, is a pair of apertured mounting ears or brackets 10'. Mounted on the rear flange 8 of the upper bar 3 at an intermediate point is a finger grip or handle 11.

It is thought that the use of the holder will be readily apparent from a consideration of the foregoing. Briefly, the lower marginal portion of the license plate 10 is engaged in the lower channel bar 4. Through the medium of the grip or handle 11, the upper channel bar 3 is then elevated against the tension of the springs 7 for permitting the insertion of the upper marginal portion of the plate 10 in said bar 3. The springs 7, being mounted on the rear flanges 8 and 9 of the bars 3 and 4, respectively, interfere in no way with the insertion of the license plate in said bars. When the upper bar 3 is released, the springs 7 clamp the license plate between said upper bar and the lower bar 4 in an obvious manner. Further, the springs 7 function as guides for aligning the license plate and the upper channel bar 3. The construction and arrangement, it will be noted, is such that the holder will readily accommodate license plates of different sizes.

The foregoing is considered as illustrative only of the principles of the invention. Further, since numerous modications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A license plate holder comprising a pair of opposed, spaced normally parallel channel members, resilient support means fixed between said members for maintaining them in spaced relationship, said support means including a pair of U-shaped springs, each of said springs having a bight portion and two leg portions, a first of said springs having one leg fixed to a first terminal portion of one of said channel members and a second leg fixed to a first terminal portion of the other of said channel members, a second of said springs having one leg fixed to a second terminal portion of one of said channel members and a second leg fixed to a second terminal portion of the other of said channel members whereby the channel members will be resiliently urged together for gripping a license plate therebetween.

2. The combination of claim 1 wherein said channel members include a rear channel wall and said legs are fixed to said channel members along said rear channel wall whereby a license plate gripped between said channel members may conceal said springs.

References Cited in the file of this patent

UNITED STATES PATENTS

| | | |
|---|---|---|
| 788,448 | Wolferman | Apr. 25, 1905 |
| 1,248,043 | Ware | Nov. 27, 1917 |
| 2,350,993 | Aigner et al. | June 13, 1944 |
| 2,791,046 | Goldberg | May 7, 1957 |